United States Patent [19]

Dahl et al.

[11] 3,907,045

[45] Sept. 23, 1975

[54] GUIDANCE SYSTEM FOR A HORIZONTAL DRILLING APPARATUS

[75] Inventors: Herbert Douglas Dahl; Tibor O. Edmond, both of Ponca City, Okla.

[73] Assignee: Continental Oil Company, Ponca City, Okla.

[22] Filed: Nov. 30, 1973

[21] Appl. No.: 420,409

[52] U.S. Cl. .................. 175/45; 175/94; 299/1; 340/18 CM
[51] Int. Cl.² ......................................... E21B 47/00
[58] Field of Search ............... 175/45, 26, 40, 61; 340/18 CM, 18 NC; 299/1

[56] References Cited
UNITED STATES PATENTS

| | | | |
|---|---|---|---|
| 3,285,350 | 11/1966 | Henderson | 175/40 |
| 3,406,766 | 10/1968 | Henderson | 175/61 |
| 3,529,682 | 9/1970 | Coyne et al | 175/45 |
| 3,578,807 | 5/1971 | Barrett | 175/26 X |
| 3,589,454 | 6/1971 | Coyne | 175/45 |
| 3,746,106 | 7/1973 | McCullough et al | 175/45 |

Primary Examiner—Frank L. Abbott
Assistant Examiner—Richard E. Favreau
Attorney, Agent, or Firm—William J. Miller

[57] ABSTRACT

An apparatus for boring an elongated borehole with a drilling apparatus which contains a flux sensitive coil and directional drilling control apparatus. An antenna is inserted through a borehole which has already been drilled and is connected between ground and a signal generating apparatus. Flux generated by the antenna will be picked up by the flux sensitive coil. A readout apparatus is connected to the coil, and an indication of the magnitude of the flux being cut by the coil is determined. A control system coupled to the horizontal drill is then actuated to maintain the horizontal drill along a predetermined path which is substantially parallel to the borehole previously drilled.

2 Claims, 3 Drawing Figures

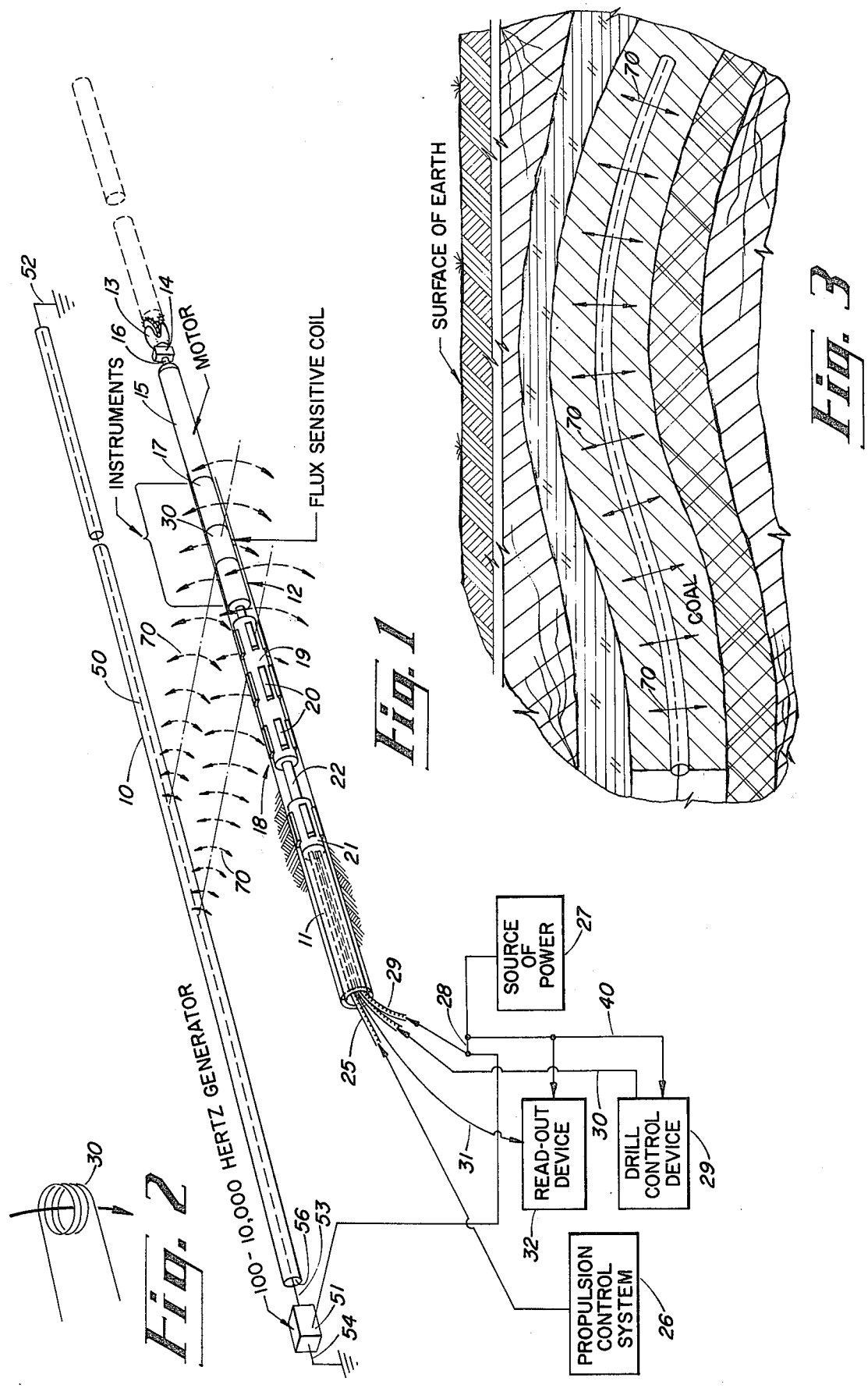

GUIDANCE SYSTEM FOR A HORIZONTAL DRILLING APPARATUS

BRIEF DESCRIPTION OF THE PRIOR ART

A patent to Arthur Lee Barrett, U.S. Pat. No. 3,578,807, discloses a control system for maintaining a drill a predetermined distance from a bored hole by placing along the wall of the board hole adjacent the hole being bored a plurality of conductive wires. Each of the wires is tuned to a particular radio frequency so that a signal transmitted from the digging machine to the wires will be reradiated to the digging machine, giving information as to the distance between the digging machine and the adjacent tunnel. A patent issued to James C. Coyne, U.S. Pat. No. 3,589,454, discloses placing two antenna configurations connected to respective signal generators on the surface of the earth in order to generate a rotating field in the vicinity of the horizontal drill. A three-dimensional magnetometer detects the rotating magnetic field and communicates the information detected to the outside of the borehole. The information communicated to the operator is used to control the direction of the horizontal drill.

BRIEF DESCRIPTION OF THE INVENTION

This invention relates to a system for controlling a horizontal drill in order to maintain the drill a predetermined distance from a previously drilled borehole. The invention contemplates inserting a long-wire antenna through the borehole previously drilled and connecting one end of the antenna to ground and the other end to the output terminal of signal generator. The remaining terminal of the signal generator is connected to ground, completing the circuit. When a signal is generated in the long wire, a flux normal to the axis of the wire will be generated. A coil sensitive to the flux direction mounted in the horizontal drill will detect the vertical lines of flux being generated by the long wire. If the drill becomes disoriented, the output from the coil will diminish or increase. The increase or decrease respectively of the voltage in the coil will be an indication of the disorientation of the drilling mechanisms. The signal from the coil is communicated to a readout device which may be external of the borehole. Indications from the readout device will then be transmitted via a controlled circuit to the horizontal drilling mechanism operating it in a manner to maintain direction control of the horizontal drilling apparatus.

The long-wire antenna system has a distinct advantage over a complex antenna system in that it can be easily inserted into a small diameter borehole under the ground and afford sufficient control information to maintain a horizontal drill reasonably oriented with respect to the previously drilled borehole.

BRIEF DESCRIPTION OF THE FIGURES

Referring to the drawings,

FIG. 1 discloses a perspective view of two boreholes, one which is drilled and one which is being drilled, and illustrates the use of the long-wire antenna to control the drilling apparatus;

FIG. 2 is a diagram illustrating the flux-sensitive coil mounted in the horizontal drill and also illustrates the direction of the flux when the drilling mechanism is properly oriented; and FIG. 3 illustrates a typical borehole in a coal seam having an antenna inserted therein.

DETAILED DESCRIPTION OF THE INVENTION

Referring to all of the figures but in particular to FIG. 1, a previously drilled borehole 10 has been formed in a coal seam, for example. A second borehole 11 is in the process of being formed and contains therein a drilling apparatus generally referred to by the number 12. Such a drilling apparatus usually includes a drill bit 13, a drill bit deflection control mechanism 14, a drill bit motor 15, which is coupled to the drill bit to a shaft 16, an instrument package 17, and a propulsion system generally referred to by the number 18. The propulsion system usually includes a drive cylinder 19, having a plurality of pressure feet 20, mounted around drive cylinder 19. A reset cylinder 21 is connected to the instrument package by means of a shaft 22. Shaft 22 passes through drive cylinder 19 and is coupled to a piston inside drive cylinder 19. Hydraulic pipes 25 are coupled between propulsion system 18 and a propulsion control system 26. Motor 15 may be electrical or hydraulic. If motor 15 is electric, for example, a source of power 27 is coupled to a wire 28 and to a cable 29 which is connected electrically to motor 15.

The instrument package 12 contains therein a means for rolling the instrument package 17, motor 15, the drill bit deflection mechanism 14, and drill bit 13. The drill control device 29, which is coupled to control circuit 30, sends commands to the control system to roll, if necessary, the deflection unit 14 into the proper position to urge drill 13 in a desired direction. The flux-sensitive coil referred to generally by the number 30 is coupled through wire 31 to a readout device 32. Readout device 32 and drill control device 29 may be coupled through a wire 40 to source of power 27.

A long-wire antenna 50 is coupled to a signal generator 51, which may cover a range of frequencies from 100 to 10,000 hertz. One end of long-wire antenna 50 is connected through a wire 52 to ground and a wire 53 to the output of generator 51. The other input terminal 54 is connected to ground to complete the electrical circuit. Wire 53 may have an insulation sheath 56 covering wire 53 to electrically insulate it from borehole 10.

OPERATION

Referring to FIGS. 1 and 2, the operation of the system will be explained. Generator 51 will be set for some predetermined frequency between 100 and 10,000 hertz. The proper frequency to be selected will depend upon the earth characteristics and the spacing of the boreholes. The alternating current passing down wire 53 through wire 52 to ground will generate a flux normal to the axis of the wire as illustrated by flux pattern 70. These flux patterns will pass through the flux-sensitive coil shown in FIG. 2. As it passes down the axis of the coil, a voltage will be generated in the various turns of the coil. The amount of voltage generated will be proportional to the distance between the signal generating source 15 and the axis of the coil 30. If the drill should begin to deviate from a parallel orientation, the output voltage will increase or decrease. The deviation in voltage will be communicated to readout device 32. Such a communication will indicate that a correction from the drill control device 29 must be made in order to reorient the drill. In order to accomplish the reorientation, the drill bit deflection control means 14 must be oriented properly with the axis of the borehole where pressure, when applied, will deflect drill 13 in the proper manner to correct for the deviation. To accomplish the above, the instrument package 17, motor 15, deflection control means 14, and drill 13 are rotated about the axis of the horizontal drill to a position proper for reorienting the drill. The deflection control means is then operated in a manner to push the drill in the proper direction. The deflection control means 14 will maintain pressure until the drill has properly reoriented itself along the prescribed axis.

A unique feature of this invention is illustrated in FIG. 3 where a coal seam is shown in an orientation which is other than perfectly level. Under these conditions, the horizontal drill must follow the center of the coal seam. The second hole drilled must also follow the undulations of the coal seam and, in addition, remain parallel to the previously drilled borehole. It is obvious in viewing this situation that control systems from the surface of the earth could not maintain a drill parallel to an undulating borehole. The antenna will generate flux normal to the axis of the antenna. Such flux 70 will always maintain a direction which is normal to the axis of the antenna regardless of the undulations of the borehole. A horizontal drill following such an antenna will always tend to maintain the coil normal to the flux pattern. Such an arrangement will cause the drill to bore a hole parallel to the undulating hole previously drilled.

If the horizontal drill should bore above or below the previously drilled hole, this fact can be determined by rolling the drill instrument package until maximum signal is realized from coil 30. The angular position for the maximum signal from coil 30 with respect to gravity will indicate axial alignment of the coil with respect to the flux field. Gravity can easily be determined by a pendulum or a fixed coil system responsive to the earth's magnetic field. A gyroscope can also be used for a vertical reference.

It is obvious that other configurations can be used and still be within the spirit and scope of the invention as disclosed in the specification and appended claims without departing from the basic concept of the invention disclosed herein.

What we claim is:

1. In an apparatus for boring an elongated generally horizontal borehole where the drilling apparatus contains a directional drilling control apparatus, a means for maintaining a second borehole being bore parallel to a first borehole already bored, comprising:

a flux-sensitive coil having its axis oriented normal to said apparatus for boring;

a signal generating means having a pair of terminals;

antenna means disposed insulatively along the length of said first borehole, having one end grounded and the remaining end connected to one of said terminals with said remaining signal generating means terminal being connected to ground;

means connecting said flux-sensitive coil to a readout means which indicates maximum voltage response; and means coupled to said directional drilling control apparatus for directionally controlling said drilling apparatus responsive to said measured flux magnitude from said readout apparatus to maintain maximum response.

2. An apparatus as defined in claim 1 wherein said antenna means comprises a single insulated long wire.

* * * * *